United States Patent [19]
Armanca

[11] Patent Number: 5,942,807
[45] Date of Patent: Aug. 24, 1999

[54] VEHICLE STARTER DISABLING THEFT DETERRENT SYSTEM

[76] Inventor: Daniel E. Armanca, 622 S. 18th St., Arlington, Va. 22202

[21] Appl. No.: 09/096,419

[22] Filed: Jun. 11, 1998

[51] Int. Cl.[6] ................................... B60R 25/04
[52] U.S. Cl. ...................... 307/10.3; 307/10.2; 180/287; 123/179.1
[58] Field of Search ................... 307/10.3, 10.4, 307/10.2, 10.5, 10.6; 180/287; 361/160, 171; 123/179.1, 179.4; 340/426

[56] References Cited

U.S. PATENT DOCUMENTS

| | | | |
|---|---|---|---|
| 3,849,663 | 11/1974 | Bogusz | 307/10.3 |
| 4,209,709 | 6/1980 | Betton | 180/287 |
| 4,479,064 | 10/1984 | Monsen | 307/10.4 |
| 4,739,736 | 4/1988 | Branco | 307/10.3 |
| 5,079,436 | 1/1992 | Elkins | 307/10.3 |
| 5,224,567 | 7/1993 | Tomlinson | 180/287 |
| 5,353,006 | 10/1994 | Aguilar | 340/426 |
| 5,431,244 | 7/1995 | Possobom | 180/287 |
| 5,548,164 | 8/1996 | Hillard et al. | 307/10.3 |

Primary Examiner—Albert W. Paladini

[57] ABSTRACT

A vehicle anti-theft system is provided including a starter having a housing mounted within an engine compartment. An armature shaft is situated within the housing and has a small gear formed thereon for moving along an axis thereof upon the receipt of a starter signal. Also included is a stopper for selectively precluding the armature from moving.

4 Claims, 2 Drawing Sheets

VEHICLE STARTER DISABLING THEFT DETERRENT SYSTEM

BACKGROUND OF THE INVENTION

1. Field of the Invention

The present invention relates to vehicle anti-theft devices and more particularly pertains to a new vehicle starter disabling theft deterrent system for preventing the theft of a vehicle by disabling a starter thereof.

2. Description of the Prior Art

Known prior art vehicle anti-theft devices include U.S. Pat. No. 4,479,064; U.S. Pat. No. 5,224,567; U.S. Pat. No. 5,079,436; U.S. Pat. No. 5,431,244; U.S. Pat. No. 5,353,006; and U.S. Pat. No. 5,453,730.

In these respects, the vehicle starter disabling theft deterrent system according to the present invention substantially departs from the conventional concepts and designs of the prior art, and in so doing provides an apparatus primarily developed for the purpose of preventing the theft of a vehicle by disabling a starter thereof.

SUMMARY OF THE INVENTION

The general purpose of the present invention, which will be described subsequently in greater detail, is to provide a new vehicle starter disabling theft deterrent system apparatus and method which has many of the advantages of the vehicle anti-theft devices mentioned heretofore and many novel features that result in a new vehicle starter disabling theft deterrent system which is not anticipated, rendered obvious, suggested, or even implied by any of the prior art vehicle anti-theft devices, either alone or in any combination thereof.

To attain this, the present invention is adapted for use with a starter having a housing mounted within an engine compartment. An armature shaft is situated within the housing and has a small gear formed thereon. In use, the armature shaft is adapted for moving along an axis thereof upon the receipt of a starter signal. This engages the small gear with a large drive gear of the engine for starting an associated engine. Next provided is a mounting bracket including an inboard planar portion bolted to the housing. Coupled to the inboard planar portion is an outboard elongated tubular portion which extends in parallel with the armature shaft toward the small gear thereof. Also included is a solenoid mounted within the tubular portion of the mounting bracket. The solenoid has an arm coupled thereto which extends into the housing. In use, the arm of the solenoid has a first orientation in abutment with the armature shaft in front of the small gear for mechanically precluding the same from engaging the large drive gear. This precludes the starter from starting the associated engine. The arm of the solenoid further has a second orientation out of engagement with the armature shaft for allowing the small gear to engage the large drive gear.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle starter disabling theft deterrent system apparatus and method which has many of the advantages of the vehicle anti-theft devices mentioned heretofore and many novel features that result in a new vehicle starter disabling theft deterrent system which is not anticipated, rendered obvious, suggested, or even implied by any of the prior art vehicle anti-theft devices, either alone or in any combination thereof.

It is another object of the present invention to provide a new vehicle starter disabling theft deterrent system which may be easily and efficiently manufactured and marketed.

It is a further object of the present invention to provide a new vehicle starter disabling theft deterrent system which is of a durable and reliable construction.

An even further object of the present invention is to provide a new vehicle starter disabling theft deterrent system which is susceptible of a low cost of manufacture with regard to both materials and labor, and which accordingly is then susceptible of low prices of sale to the consuming public, thereby making such vehicle starter disabling theft deterrent system economically available to the buying public.

Still yet another object of the present invention is to provide a new vehicle starter disabling theft deterrent system which provides in the apparatuses and methods of the prior art some of the advantages thereof, while simultaneously overcoming some of the disadvantages normally associated therewith.

Still another object of the present invention is to provide a new vehicle starter disabling theft deterrent system for preventing the theft of a vehicle by disabling a starter thereof.

Even still another object of the present invention is to provide a new vehicle starter disabling theft deterrent system that includes a starter having a housing mounted within an engine compartment. An armature shaft is situated within the housing and has a small gear formed thereon for moving along an axis thereof upon the receipt of a starter signal. Also included is a stopper for selectively precluding the armature from moving.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
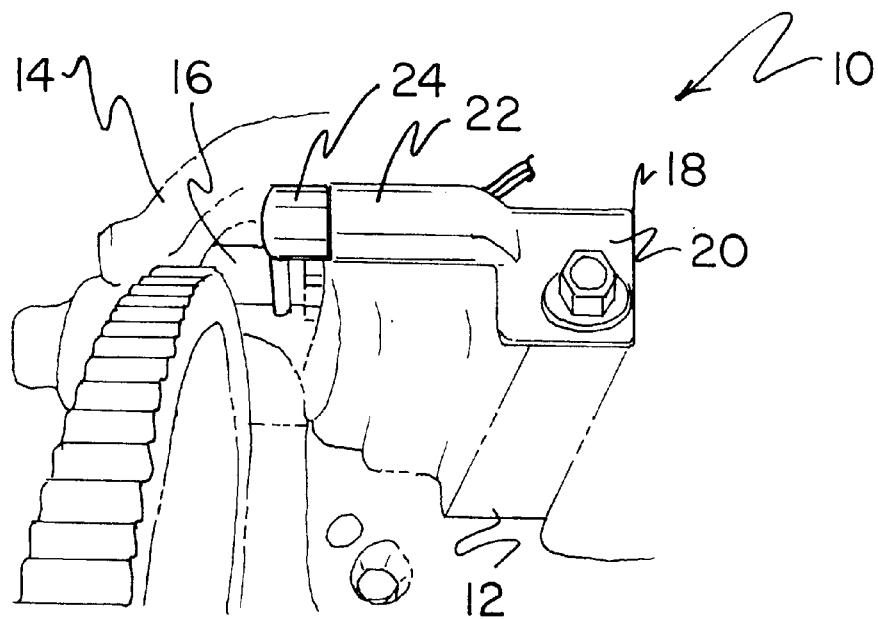
FIG. 1 is a front view of a new vehicle starter disabling theft deterrent system according to the present invention.
Figure 2:
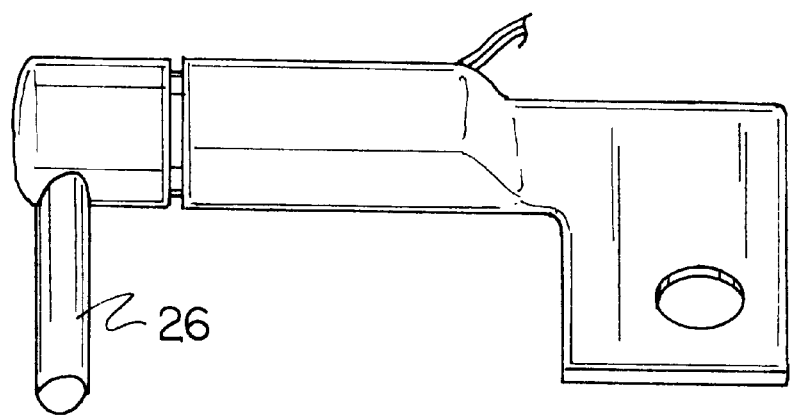
FIG. 2 is a detailed view of the solenoid and associated bracket of the present invention.
Figure 3:
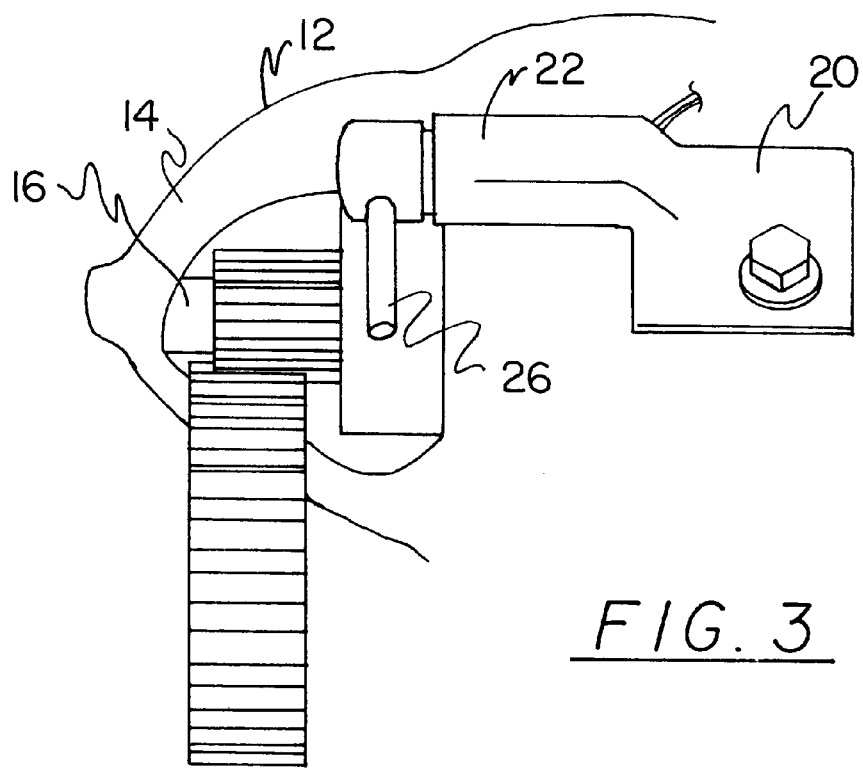
FIG. 3 is a side view of the arm of the solenoid out to engagement with armature shaft of the starter.
Figure 4:
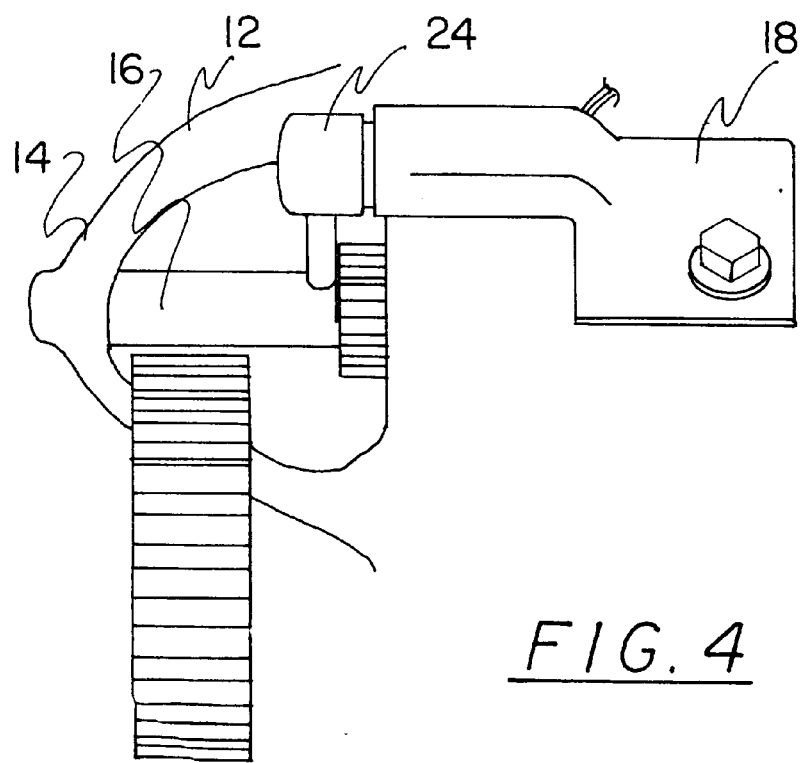
FIG. 4 is a side view of the arm of the solenoid in engagement with armature shaft of the starter.

With reference now to the drawings, and in particular to FIGS. 1 through 4 thereof, a new vehicle starter disabling theft deterrent system embodying the principles and concepts of the present invention and generally designated by the reference numeral 10 will be described.

The present invention, designated as numeral 10, is adapted for use with a starter 12 having a housing 14 mounted within an engine compartment. An armature shaft 16 is situated within the housing and has a small gear formed thereon. In use, the armature shaft is adapted for moving along an axis thereof upon the receipt of a starter signal. Such starter signal is received via an ignition of the associated vehicle. The movement of the armature shaft engages the small gear with a large drive gear of the engine for starting the vehicle.

The present invention includes a mounting bracket 18 having an inboard planar portion 20 bolted to the housing. The bolt aperture to which the bracket is attached is conventionally present on a starter housing. Coupled to the inboard planar portion is an outboard elongated tubular portion 22 which extends in parallel with the armature shaft toward the small gear thereof.

Also included is a solenoid 24 mounted within the tubular portion of the mounting bracket. The solenoid has an arm 26 coupled thereto which extends into the housing. In use, the arm of the solenoid has a first orientation in abutment with the armature shaft in front of the small gear for mechanically precluding the same from engaging the large drive gear. This precludes the starter from starting the associated engine. The arm of the solenoid further has a second orientation out of engagement with the armature shaft for allowing the small gear to engage the large drive gear.

It should be noted that the arm may be moved by the solenoid in a pivoting manner. In the alternative, the arm may be retracted by the solenoid and thus constitute a plunger. In the preferred embodiment, the solenoid has a rest position with the arm in the first orientation thereof. Further, the solenoid may be transferred to the second orientation by the depression of a discreetly hidden button or by way of a remote signal from a hand held unit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle anti-theft system comprising, in combination:

a starter including a housing mounted within an engine compartment and an armature shaft situated within the housing and having a small gear formed thereon for moving along an axis thereof upon the receipt of a starter signal, thereby engaging the small gear with a large drive gear of the engine for starting an associated engine;

a mounting bracket including an inboard planar portion bolted to the housing and an outboard elongated tubular portion coupled to the inboard planar portion and extending in parallel with the armature shaft toward the small gear thereof; and a solenoid mounted within the tubular portion of the mounting bracket and having an arm situated thereon which extends into the housing, the arm of the solenoid having a first orientation in abutment with the armature shaft in front of the small gear for mechanically precluding the same from engaging the large drive gear, thereby precluding the starter from starting the associated engine, the arm of the solenoid further having a second orientation out of engagement with the armature shaft for allowing the small gear to engage the large drive gear.

2. A vehicle anti-theft system comprising:

a starter including a housing mounted within an engine compartment and an armature shaft situated within the housing and having a small gear formed thereon for moving along an axis thereof upon the receipt of a starter signal; and a stopper for selectively precluding the armature from moving.

3. A vehicle anti-theft system as set forth in claim 2 wherein the stopper includes a solenoid.

4. A vehicle anti-theft system as set forth in claim 2 wherein the stopper includes an arm having a first orientation in abutment with the armature shaft in front of the small gear for mechanically precluding movement of the same, the arm of the solenoid further having a second orientation out of engagement with the armature shaft for allowing the small gear to move.

* * * * *